(12) United States Patent
Weis et al.

(10) Patent No.: US 10,054,084 B2
(45) Date of Patent: Aug. 21, 2018

(54) LINEAR ACTUATOR

(71) Applicant: Continental Automotive GmbH, Hannover (DE)

(72) Inventors: Christian Weis, Budenheim (DE); Carsten Mikolajek, Griesheim (DE)

(73) Assignee: Continental Automotive GmbH, Hannover (DE)

( * ) Notice: Subject to any disclaimer, the term of this patent is extended or adjusted under 35 U.S.C. 154(b) by 212 days.

(21) Appl. No.: 15/029,181

(22) PCT Filed: Oct. 10, 2014

(86) PCT No.: PCT/EP2014/071820
§ 371 (c)(1),
(2) Date: Apr. 13, 2016

(87) PCT Pub. No.: WO2015/055548
PCT Pub. Date: Apr. 23, 2015

(65) Prior Publication Data
US 2016/0258391 A1 Sep. 8, 2016

(30) Foreign Application Priority Data
Oct. 14, 2013 (DE) .................. 10 2013 220 721

(51) Int. Cl.
| F16H 25/18 | (2006.01) |
| F02M 26/52 | (2016.01) |
| F16H 37/12 | (2006.01) |
| F16H 53/06 | (2006.01) |
| F16K 31/524 | (2006.01) |

(Continued)

(52) U.S. Cl.
CPC .......... *F02M 26/52* (2016.02); *F16H 19/001* (2013.01); *F16H 25/18* (2013.01); *F16H 37/12* (2013.01); *F16H 37/124* (2013.01); *F16H 53/06* (2013.01); *F16K 31/047* (2013.01); *F16K 31/52408* (2013.01); *F02M 26/54* (2016.02); *F02M 26/67* (2016.02); *F16H 2019/008* (2013.01)

(58) Field of Classification Search
CPC ........ F16H 19/001; F16H 25/18; F16H 37/12; F16H 37/124; F16H 53/06; F02M 26/52
USPC ...................................... 74/55, 569
See application file for complete search history.

(56) References Cited

U.S. PATENT DOCUMENTS

| 978,783 A | 12/1910 | Rose | |
| 1,896,449 A * | 2/1933 | Kreidler | F16H 25/12 |
| | | | 123/56.7 |

(Continued)

FOREIGN PATENT DOCUMENTS

| DE | 732 897 A | 4/1939 |
| DE | 15 35 088 A | 10/1970 |

(Continued)

OTHER PUBLICATIONS

Vollmer, Johannes: Kurven Getriebe. 2. Auglage. Heidelbert: Dr. Alfred Huethig Verlag, 1989. Seiten 90, 91. ISBN 3-778501840-2.

*Primary Examiner* — William C Joyce
(74) *Attorney, Agent, or Firm* — Cozen O'Connor

(57) ABSTRACT

A linear actuator for driving an actuating element of an internal combustion engine of a motor vehicle has two scanning elements for scanning opposite sides of a guide cam. The guide cam has a protruding rib against which the two scanning elements are pre-tensioned to permit a play-free scan of the guide cam.

7 Claims, 1 Drawing Sheet

(51) Int. Cl.
*F16H 19/00* (2006.01)
*F16K 31/04* (2006.01)
F02M 26/54 (2016.01)
F02M 26/67 (2016.01)

(56) References Cited

U.S. PATENT DOCUMENTS

| | | | |
|---|---|---|---|
| 2,340,010 A * | 1/1944 | Miller | F02B 75/32 |
| | | | 123/78 F |
| 2,991,872 A * | 7/1961 | Keegan | B06B 1/10 |
| | | | 198/766 |
| 3,344,685 A | 10/1967 | Crouzet | |
| 4,993,275 A | 2/1991 | Pollich et al. | |
| 5,109,728 A | 5/1992 | Muszak | |
| 5,520,144 A | 5/1996 | Philo et al. | |

FOREIGN PATENT DOCUMENTS

| | | |
|---|---|---|
| DE | 38 04 333 C2 | 8/1989 |
| DE | 38 30 946 A1 | 3/1990 |
| DE | 39 29 382 A1 | 5/1991 |
| DE | 692 08 406 T2 | 8/1996 |
| DE | 10 2008 000346 A1 | 8/2009 |
| DE | 10 2009 054429 A1 | 6/2011 |
| FR | 1 427 742 A | 2/1966 |
| KR | 2010 0042779 A | 4/2010 |

* cited by examiner

LINEAR ACTUATOR

CROSS-REFERENCE TO RELATED APPLICATIONS

This is a U.S. national stage of application No. PCT/EP2014/071820, filed on Oct. 10, 2014, which claims priority to the German Application No. 10 2013 220 721.2 filed 14 Oct. 2013, the content of both incorporated herein by reference.

BACKGROUND OF THE INVENTION

1. Field of the Invention

The invention relates to a linear actuator for driving an actuator element, in particular for an internal combustion engine of a motor vehicle, with a rotatable drive shaft and an axially displaceable ram for adjusting the actuator element, with a guide curve driven by the drive shaft and with a guide member scanning the guide curve.

2. Related Art

Such linear actuators are known in practice, for example from exhaust gas recirculation valves in internal combustion engines of modern motor vehicles. In these linear actuators, the guide member has a sliding block or a ball bearing and protrudes into the guide curve formed as a guide groove. There is necessarily some play between the guide member and the guide curve. Such play is, however, usually not desirable, in particular when driving actuator elements in internal combustion engines of motor vehicles.

It could be considered to reduce the play between the actuator element and the guide curve as much as possible by restricting tolerances. However, in internal combustion engines of motor vehicles, in particular temperature changes and operating forces limit the possibility of reducing the tolerances.

SUMMARY OF THE INVENTION

An object of the invention is to solve the problem of creating a linear actuator of the type cited initially so as to provide a linear actuator exhibiting a particularly play-free drive of the ram and which reliably withstands the operating forces of internal combustion engines of motor vehicles.

This object may be met, according to one aspect of the invention in that the guide member has two scanning bodies and that the scanning bodies are pretensioned against opposite sides of the guide curve.

With this configuration, operating forces of the internal combustion engine are supported by a scanning body in both drive directions of the ram. Since at least one of the scanning bodies is pretensioned, the guide curve is scanned play-free. This leads to a play-free drive of the ram. Thus the actuator element can be regulated particularly precisely. The pretension also allows the reliable damping of operating forces of the internal combustion engine. In this way, the linear actuator has a particularly high mechanical strength and robustness on load changes.

According to an advantageous refinement of the invention, the structural complexity for pretensioning the scanning bodies can be kept particularly low if the guide member has a spring element for pre-tensioning the scanning bodies towards each other or away from each other.

The guide curve could, for example, be configured as a groove and the scanning bodies could be pretensioned against the wall of the groove. This however requires either a particularly wide groove or very small scanning bodies. In actuator elements for components of an internal combustion engine, however, space is very limited. The bodies require sufficient stability under the loads of the internal combustion engine, and hence corresponding dimensions. Linear actuators provided in particular for the internal combustion engine of a motor vehicle however have a particularly high stability with limited construction space if the guide curve has a protruding rib and the scanning bodies lie against opposite sides of the rib.

According to another advantageous refinement of the invention, lateral loads and tipping moments in the linear actuator can be kept particularly low if the contact points of the two scanning bodies on the guide curve are arranged to be aligned with an axis of the ram.

The scanning bodies could, for example, be constructed as sliding bodies. Such sliding bodies, however, require permanent lubrication and are usually sensitive to temperature changes and mechanical impact loads. Linear actuators provided in particular for the internal combustion engine of a motor vehicle, however, have a permanent stability if the scanning bodies each comprise a roller bearing. With this configuration, the roller bearings can roll on the guide curve.

According to another advantageous refinement of the invention, a proposed translation of the linear actuator can easily be set if the guide curve is arranged on a disc extending over a partial circle, if the disc on its periphery has a partial toothed rim and if a pinion driven by the drive shaft intermeshes with the partial toothed rim. Furthermore, in this way the linear actuator has particularly small dimensions.

According to another advantageous refinement of the invention, a high mechanical impact strength can be achieved easily if a fixed stop protrudes into the movement region of the disc. This contributes to a further increase in the stability of the linear actuator.

According to another advantageous refinement of the invention, the structural complexity for limiting the movements of the ram is supported if a valve body connected to the ram comprises a second stop.

According to another advantageous refinement of the invention, the linear actuator has a particularly simple structural form if the spring element is configured as a bow-shaped spring plate connecting the two scanning bodies together. This embodiment furthermore leads to a reduction in the number of components of the linear actuator.

BRIEF DESCRIPTION OF THE DRAWINGS

The invention allows numerous embodiments. For further clarification of its basic principle, one embodiment is shown in the drawings and described below. In the drawings.

DETAILED DESCRIPTION OF THE PRESENTLY PREFERRED EMBODIMENTS

Figure 1:
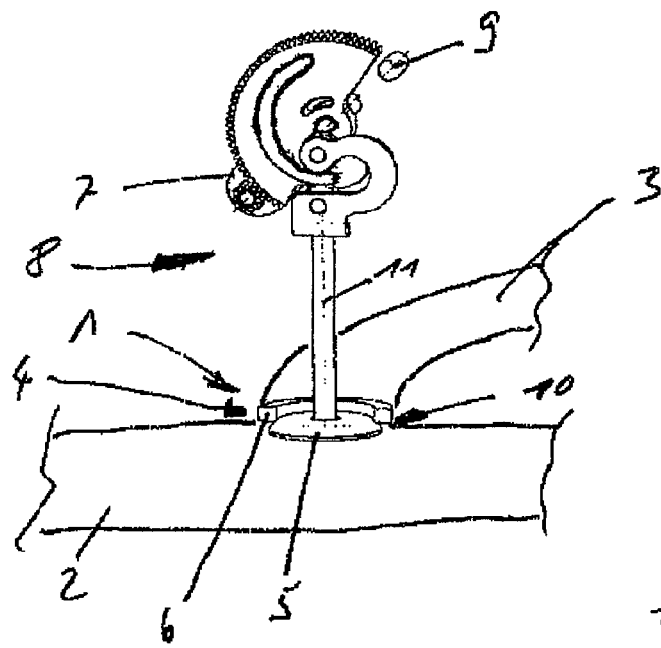
FIG. 1 shows, diagrammatically, a linear actuator with adjacent components of an actuator element.

FIG. 1 shows an exhaust gas recirculation valve 1 of a motor vehicle with an exhaust channel 2 and a return channel 3. The exhaust gas recirculation valve 1 has an actuator element 4 with a valve body 5 and a valve seat 6. A linear actuator 8 driven by the electric motor 7 serves to drive the actuator element 4. The linear actuator 8 has a fixed stop 9 and a second soft stop 10. The second stop 10 is formed by the valve seat 6 on which the valve body 5 lies. The linear actuator 8 has a ram 11 for driving the valve body 5.

Figure 2:
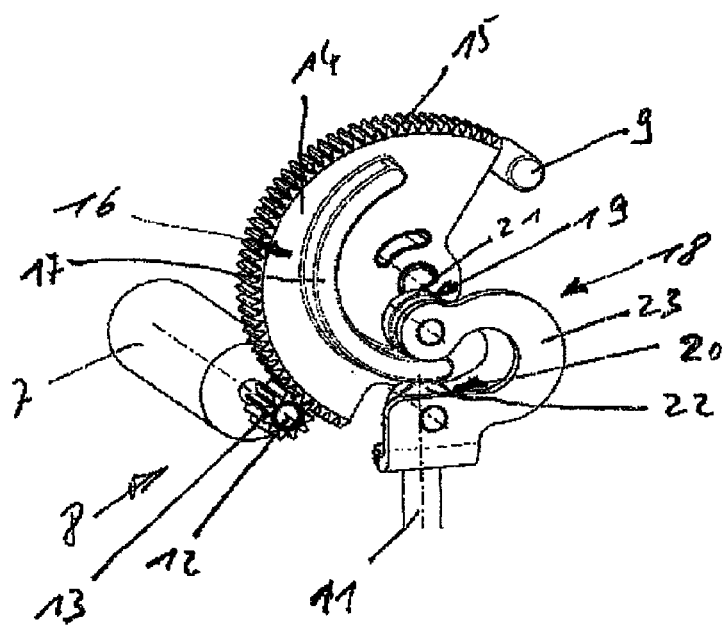
FIG. 2 is an enlarged perspective view of the linear actuator in FIG. 1.

FIG. 2 shows the linear actuator 8 from FIG. 1 in perspective and enlarged. It is evident from the figure that the electric motor 7 drives a drive shaft 12 with a pinion 13. The linear actuator 8 has a disc 14 extending over a partial circle with a partial toothed rim 15 arranged on the periphery. The pinion 13 drives the disc 14 via the partial toothed rim 15. A guide curve 16 with a rib 17 is arranged on the disc 14. A guide member 18 protruding scanning the guide curve 16 has two mutually opposing scanning bodies 19 and 20. The bodies 19 and 20 respectively comprise roller bearings 21 and 22 each formed as a ball bearing, and are connected together via a spring element 23. The spring element 23 is bow-shaped and is made of spring steel. The spring element 23 is furthermore connected to the ram 11.

By turning the disc by the drive of the electric motor, the roller bearings of the scanning bodies roll on the rib of the guide curve. The guide member is thus moved so as to follow the form of the guide curve towards the rotary point of the disc or away from this. The movement is transmitted via the ram to the valve body, which finally opens or closes the exhaust gas recirculation valve. As evident from FIGS. 1 and 2, the axis of the ram 11 aligns with the contact points of the two scanning bodies 19, 20 on the rib 17. The axis of the ram 11 also intersects with the rotational axis of the disc 14.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A linear actuator (8) for driving an actuator element (4) for an internal combustion engine of a motor vehicle, comprising:
   a rotatable drive shaft (12);
   an axially displaceable ram (11) configured to adjust the actuator element (4);
   a guide curve (16) driven by the rotatable drive shaft (12); and
   a guide member (18) configured to scan the guide curve (16), the guide member (18) comprising:
   (a) a bow-shaped spring plate (23),
   (b) a first scanning body (19) arranged at an upper end of the bow-shaped spring plate (23) of the guide member (18), and
   (c) a second scanning body (20) arranged at a lower end of the bow-shaped spring plate (23) of the guide member (18), the first and second scanning bodies (19, 20) of the guide member (18) being pretensioned against opposite sides of the guide curve (16) by the bow-shaped spring plate (23) of the guide member (18),
   wherein the ram (11) is connected to the lower end of the bow-shaped spring plate (23) of the guide member (18), the ram (11) being driven axially, to adjust the actuator element (4), by the guide member (18) based upon axial movement produced by interaction between the first and second scanning bodies (19, 20) of the guide member (18) and the guide curve (16).

2. The linear actuator as claimed in claim 1, wherein the guide curve (16) has a protruding rib (17) and the first and second scanning bodies (19, 20) of the guide member (18) lie against opposite sides of the rib (17).

3. The linear actuator as claimed in claim 1, wherein contact points of the first and second scanning bodies (19, 20) of the guide member (18) on the guide curve (16) are arranged so as to be aligned with a rotational axis of the ram (11).

4. The linear actuator as claimed in claim 1, wherein the first and second scanning bodies (19, 20) of the guide member (18) each comprise a roller bearing (21, 22).

5. The linear actuator as claimed in claim 1, further comprising:
   a disc (14) extending over a partial circle; and
   a pinion (13), driven by the drive shaft (12),
   wherein the guide curve (16) is arranged on the disc (14), the disc (14), on its periphery, has a partial toothed rim (15), and the pinion (13) intermeshes with the partial toothed rim (15) of the disc (14).

6. The linear actuator as claimed in claim 5, further comprising a fixed stop (9) protruding into a movement region of the disc (14).

7. The linear actuator as claimed in claim 1, further comprising a valve body (5) connected to the ram (11), the valve body (5) comprising a second stop (10).

* * * * *